INVENTOR.
JOHN B. LEECE
BY
*Kwis, Hudson, Boughton & Williams*
ATTORNEYS

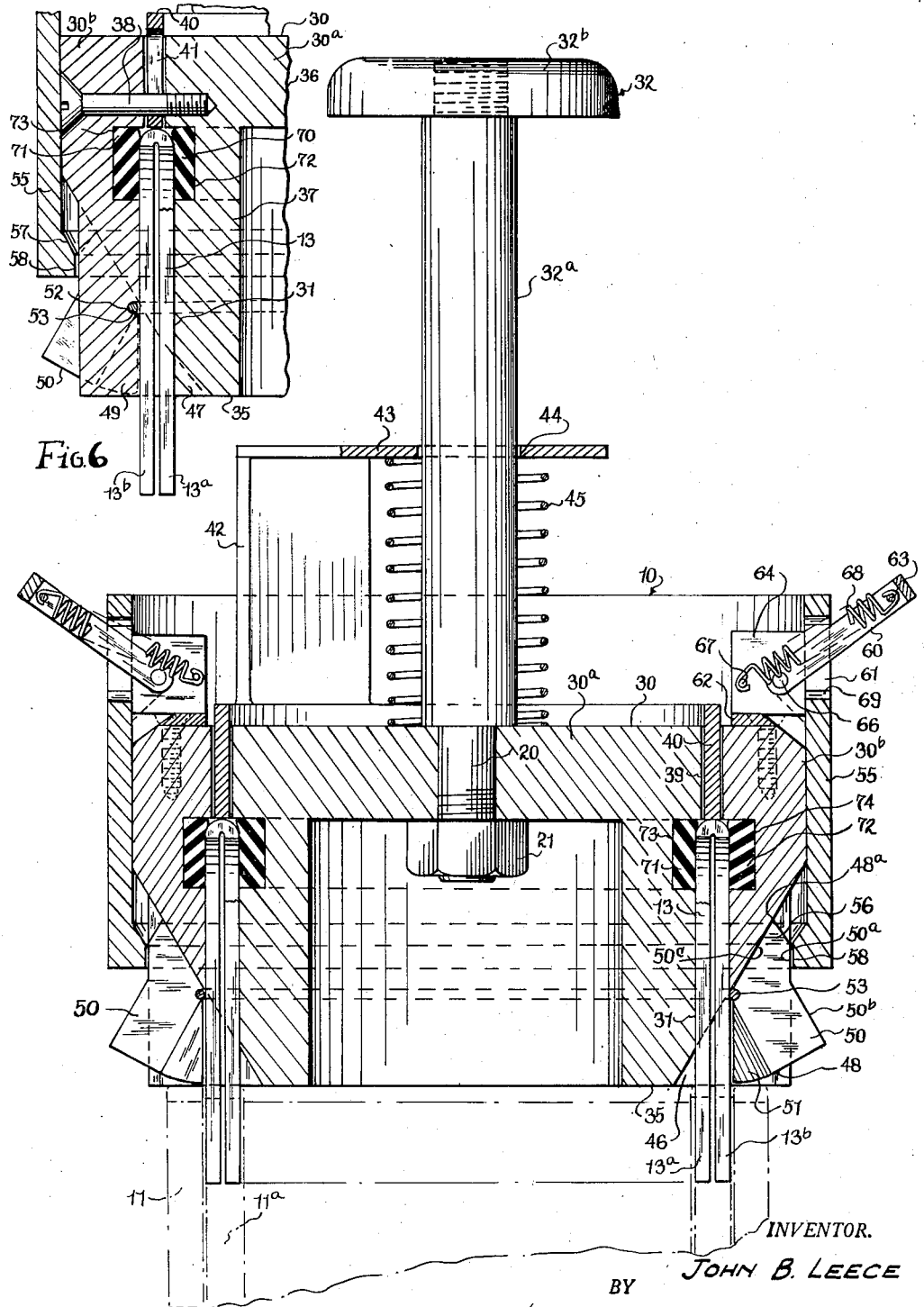

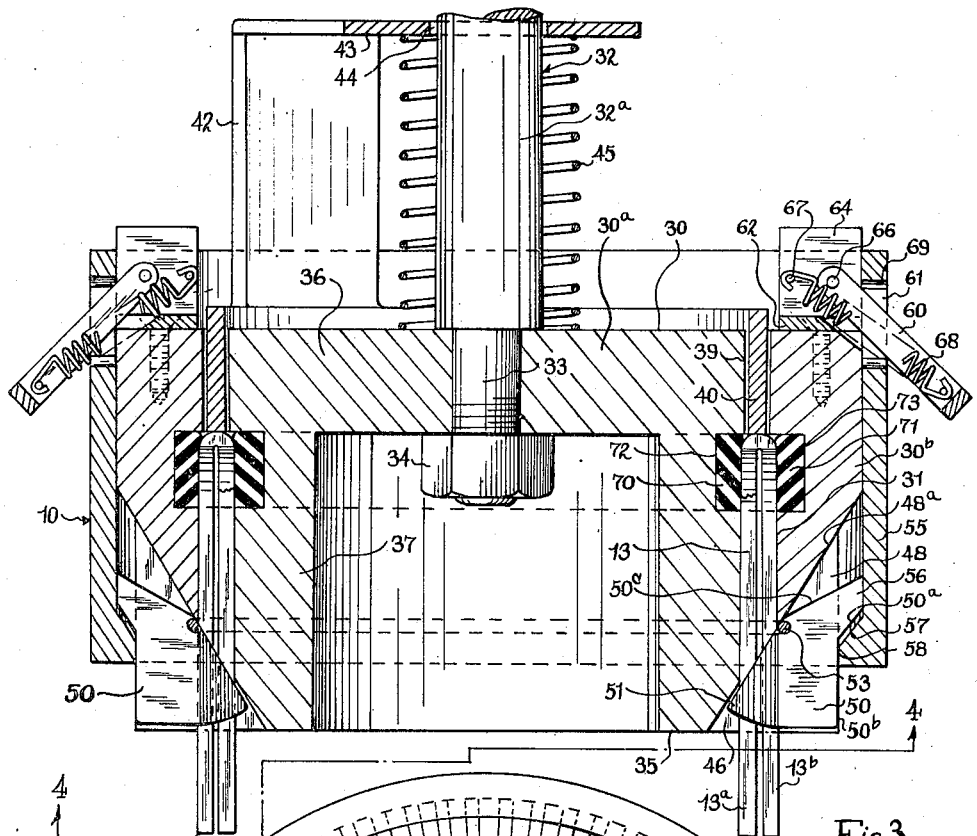
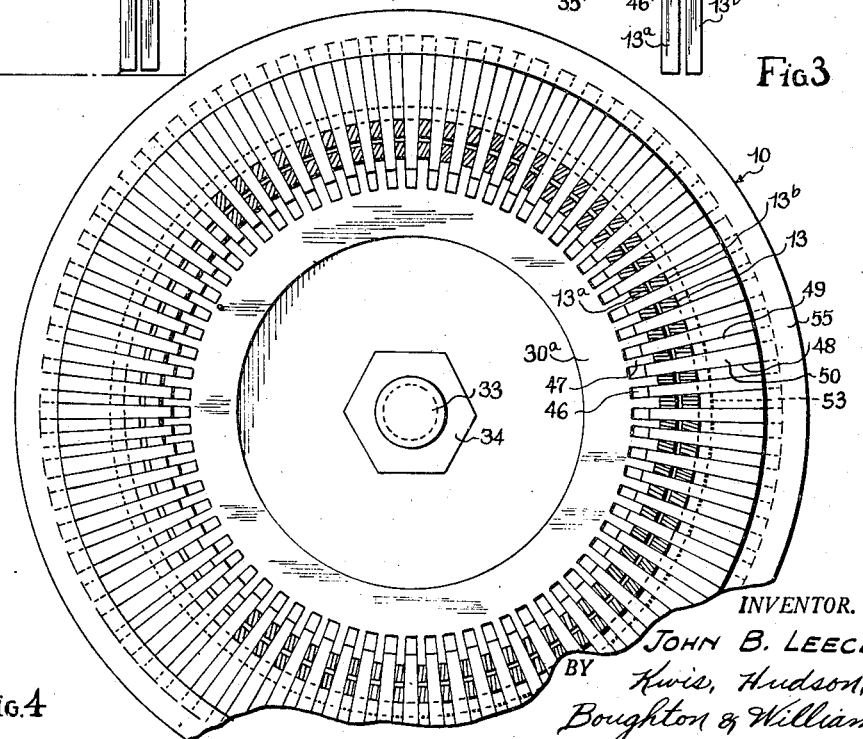

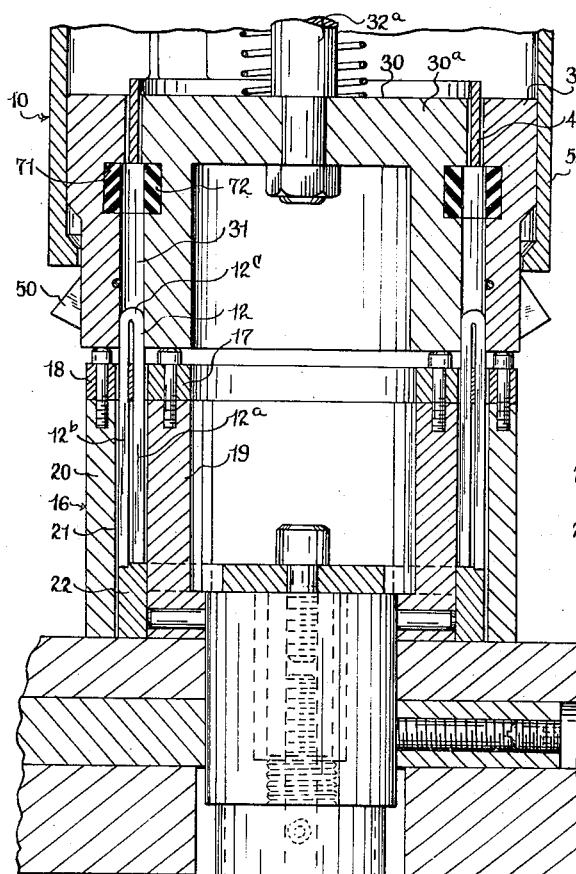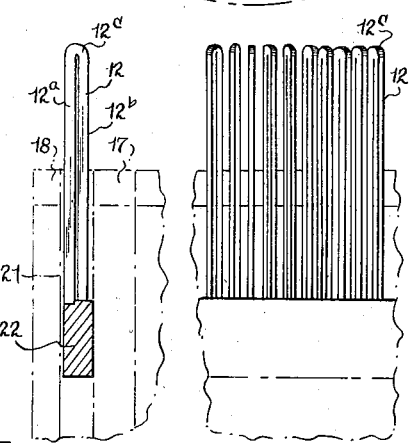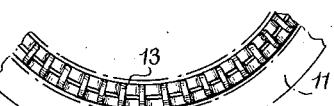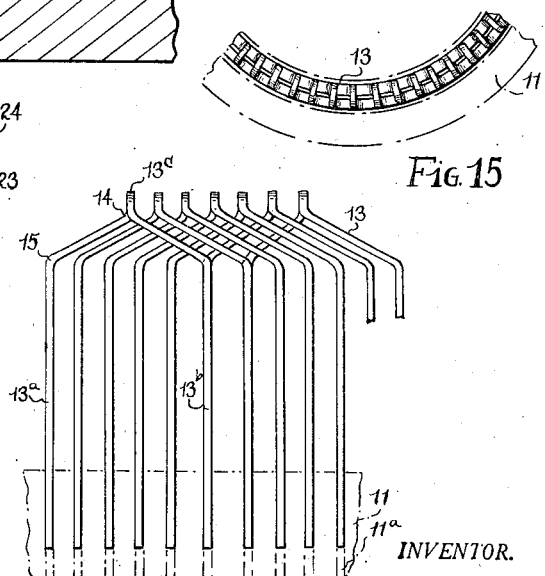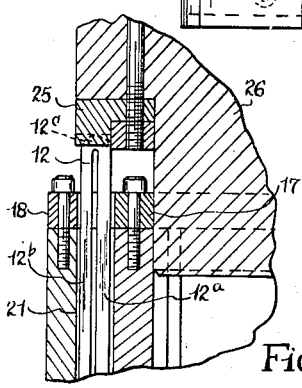

Patented July 19, 1949

2,476,745

UNITED STATES PATENT OFFICE 2,476,745

DEVICE FOR GRIPPING, LIFTING, AND HANDLING AN ANNULAR GROUP OF ARTICLES SUCH AS ELECTRICAL COILS

John B. Leece, University Heights, Ohio, assignor to The Leece-Neville Company, Cleveland, Ohio, a corporation of Ohio Application September 11, 1946, Serial No. 696,092

19 Claims. (Cl. 153—10)

This invention relates to article handling devices and, as one of its objects, aims to provide an improved device of this kind by which a number of similar articles can be picked up simultaneously and can be maintained in a desired grouped relation while being thus temporarily held or carried.

Another object of the present invention is to provide an improved article handling device of this character, which can be used to advantage in handling various kinds of articles during manufacturing or assembling operations relating thereto, such as for handling or transporting electrical coils between different fabricating operations performed thereon, or for use in inserting or assembling a group of such coils either into a temporary holder or into a permanent holder such as an armature member or stator of which they are to become a part.

A further object of this invention is to provide an improved article handling device of the character mentioned, having a body provided with a recess adapted to receive the articles or portions thereof and also having gripping means adapted to releasably retain the articles in such recess.

Still another object of the invention is to provide an article handling device of this type, in which a portion of the body adjacent the outer end of the recess is slotted and a plurality of clamping blades are movable in the slots so as to grip or release the articles.

Yet another object is to provide an improved device of the character referred to, in which the article-receiving recess and the group of clamping blades are annularly disposed and a cylindrical member movable relative to the body actuates all of the blades simultaneously for gripping or releasing the articles.

The present invention also provides improved apparatus of the character metioned, in which the gripping means for the articles consists of or includes a resilient means adapted to frictionally grip the articles and retain the same in the desired arrangement and the apparatus also includes an ejecting means for releasing the articles from such frictional grip.

Additionally, this invention provides an article handling device adapted for use with a fabricating machine embodying a die mechanism and means for ejecting a group of articles therefrom, and wherein the handling device is adapted to have the grouped articles charged thereinto by the ejector means of the fabricating machine and to grip the grouped articles to enable them to be transferred to another station.

The invention can be further briefly summarized as consisting in certain novel combinations and arrangements of parts hereinafter described and particularly set out in the claims hereof.

In the accompanying sheets of drawings

Fig. 2 is a vertical sectional view thereof taken on line 2—2 of Fig. 1 and showing the article gripping blades in their released position;

Fig. 3 is a vertical sectional view similar to Fig. 2 but showing the blades actuated to their article gripping position;

Fig. 4 is a partial bottom plan view of the device taken as indicated by line 4—4 of Fig. 3 and with some of the articles shown in cross-section.

Fig. 6 is a partial vertical sectional elevation taken through the device at a point between adjacent slots as indicated by line 6—6 of Fig. 5;

Fig. 9 is a vertical section, showing the improved handling device being used in conjunction with a fabricating machine;

Fig. 10 is a partial vertical sectional view taken through the fabricating machine and showing the die mechanism thereof including a third die ring which is adapted to be removed and replaced by the improved handling device;

Fig. 11 is a vertical section, more or less diagrammatic in form, showing one of a group of electrical coils as an example of the articles adapted to be handled by the improved device;

Figs. 12 and 13 are partial side and plan views, respectively, of an annular group of coils of the hairpin type shown in Fig. 11;

Fig. 14 is a side elevational view, also more or less diagrammatic in character, showing a similar group of electrical coils of a specifically different form; and Fig. 15 is a plan view of the coils shown in Fig. 14.

Figure 1:
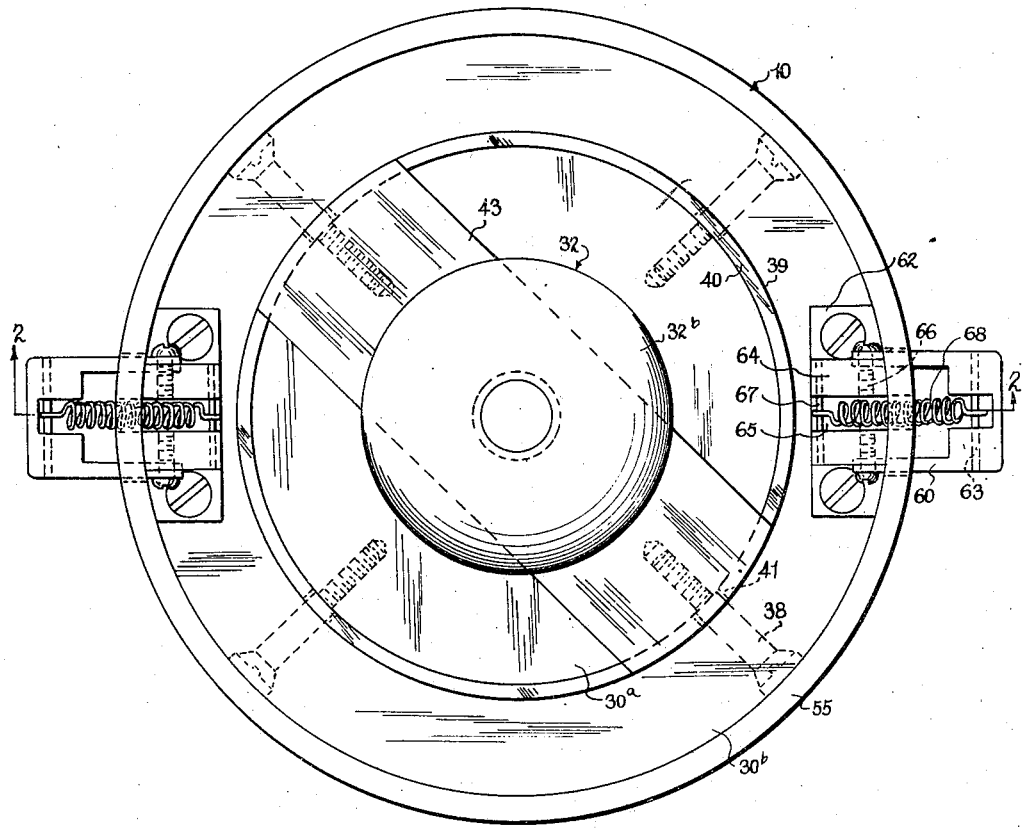
Fig. 1 is a top plan view of an article handling device constructed according to the present invention.
Figure 5:
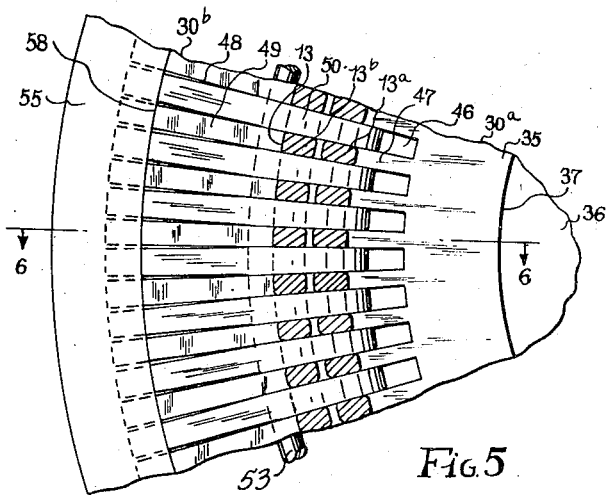
Fig. 5 is a partial bottom plan view similar to Fig. 4 but on a larger scale.

Before proceeding with the detailed description of the improved article handling device 10, it should be explained that this device can be used for handling various different specific forms of articles and, as mentioned above, can be used to advantage in handling or transferring electrical coils during the fabrication or shaping thereof and also for the purpose of assembling such coils into a machine part 11 (see Fig. 2) such as a stator, armature member or the like, of which the coils are to become a part and which has annularly spaced axial slots 11a into which the coils are inserted by the handling device. Figs. 11 to 13 inclusive and Figs. 14 and 15 show, by way of example, two groups of electrical coils 12 and 13 of specifically different forms with which this handling device can be used. The coils of both groups are made of copper wire of a substantially rectangular cross-section, the coils 12 having what can be conveniently termed a "hairpin" shape and the coils 13 being of substantially "wishbone" shape.

Each of the coils 12 comprises a pair of spaced substantially parallel legs 12a and 12b and a 180° connecting bend 12c of relatively small radius. The legs 12a and 12b and the connecting bend 12c all lie in substantially the same plane as shown in Figs. 12 and 13. The coils 12 may be obtained by bending or shaping copper wire of substantially rectangular cross-section to the form shown in Fig. 11, or preferably, by subjecting a wire blank to a bending operation in suitable apparatus provided for this purpose.

Each of the coils 13 comprises a pair of spaced legs 13a and 13b which extend in substantially parallel relation for a substantial portion of their length. At the upper end of the coil the legs 13a and 13b are connected by a small radius 180° bend 13c. At points adjacent the connecting bend 13c each leg is provided with two bends 14 and 15. Because of the bends 14 and 15 formed in the legs 13a and 13b their parallel portions are spread apart and do not lie in the same plane as in the case of the legs 12a and 12b of the coils 12. The coils 13 can be obtained by bending or shaping the wire to the form shown in Figs. 14 and 15, but preferably, are obtained by subjecting the coils 12 to a shaping operation. Figs. 9 and 10 show a fabricating or coil-shaping machine 16 which is suitable for this purpose and with which the article handling device 10 to be described hereinafter, is adapted to be used in a novel manner.

The coil-shaping machine 16 need be only briefly described here inasmuch as this machine is more fully disclosed and is claimed in copending application Serial No. 696,090 filed September 11, 1946. The machine 16 comprises a pair of relatively rotatable inner and outer die rings 17 and 18 respectively, having cooperating radial slots in their adjacent peripheries. The die ring 17 is carried by a rotatable or oscillatable sleeve 20. The slotted portions of the die rings overlie an annular space 21 defined between the sleeves 19 and 20 and in which an annular ejector 22 is adapted to be axially moved by the piston 23 of the ejector cylinder 24. The machine 16 also includes a third die ring 25 (see Fig. 10) which is carried by a weighted body 26 and is slotted for cooperation with the slotted portions of the die rings 17 and 18. The third die ring 25 is rotatable with the body 26 relative to the sleeve 19 and is removable from the die rings 17 and 18 by lifting of the weighted body.

The coils 12 are placed in the machine 16 in an annular series, as represented in Fig. 13, either by being manually inserted individually or by being inserted as a group by means of the handling device 10. The legs 12a and 12b extend into the space 21 through the slots of the die rings 17 and 18 and the bends 12c at the top of the coils engage in the slots of the third die ring 25. By rotating the outer die ring 18 the bends 14 and 15 are formed and the coils 12 are converted into the coils 13. At this time the coils 13 are also in an annular series as represented in Fig. 15. In the annular series of Fig. 13 the adjacent or radially aligned legs 12a and 12b are portions of the same coil but in the annular series of Fig. 15 the adjacent or radially aligned legs 13a and 13b are portions of two different coils of the series.

After the shaping operation has taken place to convert the coils 12 into the coils 13 as described above, the third die ring 25 and weighted body 26 are removed from the machine 16 and the handling device 10 is substituted in its place as shown in Fig. 9. The ejector 22 is then actuated to eject the coils 13 from the die rings 17 and 18 and to transfer or project the coils into the handling device 10.

To proceed with the detailed description of the handling device 10 it will be seen from the drawing, and particularly from Fig. 3 thereof, that this device is provided with a body 30 having a recess 31 into which a group of articles such as the electrical coils 13 extend and are releasably held. As has been indicated above, the improved device can be adapted for the handling of groups of various different articles but in the present embodiment the recess 31 of the body 30 is an annular recess so as to adapt the device for the handling of annular groups of the coils 13. To simplify the detailed description of the construction of the device and its intended operation, the invention is hereinafter described with reference to the handling of a group of annularly spaced electrical coils 12 or 13 although it should be understood that the invention is not to be regarded as limited in this respect.

The body 30 is provided at its upper end with a suitable handle 32 by which the device can be lifted or carried. The handle 32 includes a stem 32a disposed in coaxial relation to the body and whose lower end is connected thereto by means of the reduced extension 33 and the nut 34 threaded thereon. The handle also includes a knob 32b mounted on the upper end of the stem 32a. The article-receiving recess 31 extends into the body 30 from the lower end or face 35 thereof and is disposed in coaxial relation to the handle.

The body 30 can be of a one-piece construction but preferably as here shown is made up of two connected sections or body members 30a and 30b. The body member 30a is a substantially cup-shaped member having a transverse top wall 36 and a depending annular wall 37. The body member 30b is a substantially sleeve-shaped member which surrounds the member 30a and is connected thereto by a plurality of circumferentially spaced shouldered screws 38. By means of these shouldered screws the inner and outer body members 30a and 30b are maintained in spaced relation so as to define therebetween the annular recess 31 and an annular guideway 39 communicating with the upper end of the recess and in which an annular ejector member 40 is movable axially of the device.

The ejector member 40 has axial slots 41 therein which are spaced circumferentially to correspond with the spacing of the screws 38 so that these screws will extend through the slots. The slots are of a length to permit the desired extent of axial movement of the ejector member and the screws also serve as stops which are adapted to be engaged by the ends of the slots. The ejector also includes a pair of spaced arms 42 extending upwardly from the annular member 40 and a transverse actuating bar 43 connected to the upper ends of these arms and having an opening 44 through which the stem 32a of the handle extends. The stem of the handle thus forms a guide for the upper end of the ejector means. If desired a compression spring 45 can be disposed around the stem 32a of the handle between the upper end of the body member 30a and the actuating bar 43 and which normally exerts a lifting or retracting force on the ejector means.

The lower end of the inner body member 30a is provided with an annular row of radial slots 46 which communicate with the lower end of the recess 31 and such that pairs of adjacent slots are separated by intervening teeth or ribs 47. The lower end of the outer body member 30b is likewise provided with a series of annularly spaced slots 48 which communicate with the recess 31 and are located opposite to and radially outward of the slots 46 of the body member 30a. The pairs of adjacent slots 48 of the body member 30b are separated by intervening teeth or ribs 49. When the handling device 10 is being used to pick up a group of articles, such as the coils 13, the upper ends of the coils extend into the recess 31 as shown in Figs. 3 and 4 and the pairs of coil legs 13a and 13b occupy positions in the recess opposite to or in the radial alignment with the ribs 47 and 49 of the body members 30a and 30b.

Figure 8:
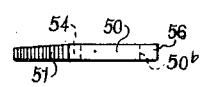
Fig. 8 is a plan view of the blade.
Figure 7:
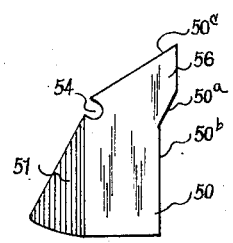
Fig. 7 is a front elevation showing one of the article clamping blades in detached relation.

For applying a clamping action to the coils 13 for temporarily retaining the same in the recess 18, the handling device is provided with a group of annularly spaced clamping blades 50 in the slots 48 of the outer body member 30b and which blades are movable in such slots in a direction transversely of the recess. As shown in Figs. 7 and 8 the blades 50 have tapered wedge portions 51 thereon which are adapted to be moved inwardly between adjacent pairs of coil legs for exerting a clamping action on such legs. In addition to the function of applying a clamping action to the legs of the coils, the blades 50 serve to hold the pairs of coil legs in the desired or prearranged annular spacing so that the lower ends of the coils which project from the handling device can be inserted into the correspondingly spaced slots of the stator or armature member 11 into which they are to be assembled.

The blades 50 are movably supported in the body 30 preferably by being pivotally mounted in the body section 30b thereof. For this purpose the ribs 49 of this body section are provided with aligned arcuately extending grooves 52 in which an annular bar or wire 53 is mounted and forms a pivot for the blades. The blades 50 are mounted on the annular pivot formed by the wire 53 by being provided with notches or recesses 54 in which this pivot engages, as shown in Figs. 2 and 3.

The swinging of the blades 50 in an inward direction to grip the paired legs of the coils 13, or in an outward direction to release the coils, is accomplished simultaneously by an actuating member which in this instance is in the form of a cylindrical sleeve 55 disposed around and axially slidable on the body member 30b. The axially slidable sleeve 55 and the radially swinging blades 50 together constitute a chuck for effectively gripping the coils 13 and retaining the same in the handling device 10.

For the accomplishment of this function the blades 50 are provided with projecting annularly disposed lever portions 56 with which the lower end of the actuating sleeve 55 cooperates. The lower end of the sleeve 55 is provided with a beveled or inclined internal annular shoulder 57 which engages the inclined side faces 50a of the blades when the sleeve is moved axially upwardly on the body member 30b. The engagement of the inclined face 57 with the blade edges 50a causes the blades to be swung outwardly on the pivot 53 to retract the tapered blade portions 51 from between the paired groups of legs of the coils 13 and thus release the coils so that they can be withdrawn or ejected from the handling device.

When the actuating sleeve 55 is moved downwardly on the body member 30b the inner periphery 58 of the lower end of the sleeve engages and slides along the side faces 50b of the blades thereby causing the blades to be swung inwardly to and held in the above-described article-gripping position shown in Fig. 3. The blades 50 are constructed so that they also have edge portions or side faces 50c extending at an angle which will cause them to coincide substantially with the inclined bottom walls 48a of the slots 48 when the blades are swung to their outward or retracted position shown in Fig. 2. When the blades are in this retracted position they are held against inward swinging movement by reason of the fact that the lever portions 56 are then held between the internal annular face 58 of the lower end of the actuating sleeve 55 and the inclined bottom faces 48a of the slots 48. From the above description of the blades 50 it will be recognized that the blade shape is such that each blade has an upper and a lower trigger portion, the upper trigger portion being formed by the lever portion 56 and the lower trigger portion by the triangular lower corner or heel of the blade. When the blades are in their article-gripping position, the upper trigger portions project from the slots 48 and when the blades are in their retracted position, the lower trigger portions project from the slots.

The blade actuating sleeve 55 can be shifted axially of the body 30 by any appropriate actuating means. In the embodiment of the invention shown in the drawings this actuating means is shown as comprising a pair of toggle levers 60 which extend through openings 61 of the sleeve adjacent its upper end and have their inner ends pivotally connected with brackets 62 which are mounted on the body 30. Each of the levers 60 is a stirrup-like member of substantially U-shape as shown in Fig. 1 and carries a transverse anchor pin 63 adjacent its outer end. Each of the brackets 62 has spaced arms 64 separated by a slot 65. The levers 60 are pivotally connected with their respective brackets by means of screws 66 which extend toward but not across the slot 65. A stationary anchor pin 67 is also provided on each of the brackets 62 at a point inwardly of the pivot screws 66. A tension spring 68 is stretched between the movable and stationary anchor pins 63 and 67 so as to sweep across the axis of the pivot 66 when the lever is swung upwardly or downwardly about this pivot axis. The arrangement just described for the levers 60 and the tension springs 68 causes the springs to produce a toggle action or snap action for the levers such that when the levers are swung upwardly or downwardly across a dead center position, the springs will assist the movement of the levers beyond such dead center position.

The levers 60 project outwardly from the brackets 62 of the body 30 through the openings 61 of the actuating sleeve 55, as mentioned above, and when the levers are swung downwardly toward their position shown in Fig. 3, they act on the lower edges of the openings 61 to push the sleeve in a downward direction so as to actuate the blades toward their contracted or article-gripping position. When the levers 60 are swung upwardly toward their position shown in Fig. 2, they act on the upper edges of the openings 61 to lift the sleeve 55 and cause the latter to retract or expand the blades 50 to their article-releasing position. The upper and lower edges of the openings 61 are provided with recesses or notches 69 which provide clearance spaces for the tension springs 68.

When the article handling device 10 is applied to an upstanding group of the annularly spaced coils 13 so that the upper ends of these coils extend into the recess 31, it is desirable that the upper ends of the coils be gripped and held in their properly spaced relation so that there will be no tendency for the coils to rock or tilt out of their annularly spaced relation. For this purpose the device is provided with a means for frictionally gripping and releasably holding the upper ends of the coils 13. In this instance this frictional gripping means is shown as comprising a pair of opposed coaxial bodies or rings 70 and 71 of yieldable sponge rubber or the like disposed in corresponding annular recesses 72 and 73 provided in the body members 30a and 30b adjacent the upper end of the recess 31. These rings can be retained in their recesses by adhesive or other suitable connecting means. When the handling device 10 is applied to a group of annularly spaced coils 13, their upper ends are forced into the space between the resilient rings 71 and 72 which causes the rings to be deflected or distorted at the points of engagement of the spaced coils therewith. This results in a frictional holding force being applied by the rings to the upper ends of the coils which will maintain the coils in the desired annularly spaced relation. If desired, these resilient frictional rings can be employed as the sole means for retaining the coils 13 in the device and in that case the clamping blades 50 and the actuating sleeve 55 therefor would be omitted.

When the coils 12 have been converted into the coils 13 by the operation of the machine 16 as described above, they are ready to be transferred to the stator 11 by the handling device 10. When the latter device has been substituted on the machine 16 in place of the third die ring 25, as shown in Fig. 9 and briefly explained above, the coils 13 extend part way into the recess 31 of the handling device and the actuation of the ejector 22 pushes the coils upwardly so as to force the tops of the coils between the resilient gripping rings 71 and 72. While the handling device is still on the machine 16 the levers 60 are swung downwardly to cause the blades 50 to grip the coil legs as explained above. The handling device 10, with the coils retained therein, is then lifted from the machine 16 and applied to the stator 11, as shown in Fig. 2, such that the legs of the coils extend part way into the slots 11a of the stator. The levers 60 are then swung upwardly to cause the blades 50 to release the coils and the ejector member 40 is pushed downwardly to eject the group of coils from the handling device and push them into the stator 11. The movement of the ejector member 40 as permitted by the slots 41 is sufficient to release the coils 13 from the resilient rings 71 and 72. The handling device is then lifted from the stator leaving the coils in the latter.

From the foregoing description and the accompanying drawings it will now be readily understood that this invention provides a relatively simple but efficient handling device by which a plurality of articles in a desired grouped relation can be picked up and transported from one station or piece of apparatus to another during fabricating operations or for purposes of assembling the articles into a machine member, stator or the like of which they are to become a part. Moreover, it will be seen that during the use of the improved article handling device, the articles will be maintained in their desired relation in the group while being thus temporarily held for handling or assembling purposes.

Although the improved article handling device of this invention has been illustrated and described herein in more or less detail, it will be understood of course that the invention is not to be regarded as being correspondingly limited in scope but includes all changes and modifications coming within the scope of the claims hereof.

Having thus described my invention, I claim:

1. A pick-up device comprising a body having an annular recess adapted to receive therein an annular group of articles in spaced relation, said body also having an annular row of slots extending along said recess with the individual slots of the row extending in a direction transversely of the recess, blades in said slots, a ring element forming a common hinge member for all of said blades and mounting the blades on said body for swinging movement into and out of the spaces between adjacent articles for clamping or releasing the articles, and actuating means for causing substantially simultaneous swinging movement of the blades.

2. A pick-up device comprising a body having an annular recess adapted to receive therein an annular group of spaced articles, an annular series of blades pivotally connected with said body for swinging movement into and out of the spaces between adjacent articles for clamping or releasing the articles, and actuating means for causing substantially simultaneous movement of the blades.

3. A pick-up device, comprising a body having an annular recess adapted to receive therein an annular group of spaced articles, and an annular series of blades pivoted on said body for swinging movement in a direction transversely of said recess into the spaces between adjacent articles of said group, said blades being tapered and of a thickness to produce a clamping action on said articles for retaining the same in said recess.

4. A pick-up device comprising a liftable body having a recess in the underside thereof adapted to receive portions of elongated articles disposed in spaced upright relation in a row, a plurality of blades pivotally connected with said body for swinging movement into and out of the spaces between adjacent articles for clamping or releasing the articles, said blades being tapered and of a thickness to produce a clamping action on said articles when moved into said spaces, lifting means connected with said body, and means for causing substantially simultaneous movement of said blades.

5. A pick-up device comprising a liftable body having an annular recess in the underside thereof adapted to receive portions of elongated articles disposed in spaced upright relation in an annular series, an annular group of blades pivotally connected with said body for swinging movement into and out of the spaces between adjacent articles for clamping or releasing the articles, said blades being tapered and of a thickness to produce a clamping action on said articles when moved into said spaces, lifting means connected with said body, and means for causing substantially simultaneous movement of said blades.

6. In a device of the character described, a body having a recess therein into which articles are adapted to extend in a spaced row and also having a row of spaced slots extending along said recess with the individual slots of the row extending in a direction transversely of the recess, blades in said slots and having trigger portions which project from said slots, means pivotally mounting said blades on said body for swinging movement such that the blades are adapted to be projected into or retracted from the spaces between adjacent articles for clamping or releasing the articles, and actuating means engageable with said trigger portions for causing substantially simultaneous movement of said blades.

7. In a device of the character described, a body having an annular recess therein into which articles are adapted to extend in a spaced row and also having an annular row of spaced slots extending along the recess with the individual slots of the row extending in a direction transversely of the recess, an annular series of blades in said slots and having trigger portions which project from said slots, means pivotally mounting said blades on said body for swinging movement such that the blades are adapted to be projected into or retracted from the spaces between adjacent articles for clamping or releasing the articles, and a common actuating means for all of the blades and being engageable with said trigger portions.

8. In a device of the character described, a body having an annular recess therein into which articles are adapted to extend in a spaced row and also having an annular row of spaced slots extending along said recess with the individual slots of the row extending in a direction transversely of the recess, blades in said slots, means pivotally mounting said blades on said body for swinging movement such that the blades are adapted to be projected into or retracted from the spaces between adjacent articles for clamping or releasing the articles, said blades having spaced trigger portions disposed so that one set of trigger portions project from said slots when the blades are projected into article clamping position and the other set of trigger portions project from said slots when the blades are retracted, and a single actuating member reciprocably movable relative to said body and engageable with one or the other of said sets of trigger portions for causing the projection or retraction of all of said blades substantially simultaneously.

9. In a device of the character described, a body having an annular recess therein into which articles are adapted to extend in a spaced row and also having a sleeve portion coextensive with the recess and containing an annular row of spaced slots extending along the recess with the individual slots of the row extending in a direction transversely of the recess, an annular series of blades, means mounting said blades on said body for swinging movement in said slots such that the blades are adapted to be projected into or retracted from the spaces between adjacent articles for clamping or releasing the articles, and a substantially cylindrical blade actuating member reciprocably movable relative to said body, said member and blades having cooperating portions adapted to cause the blades to be swingingly projected in response to movement of the member in one direction and to be swingingly retracted in response to movement of the member in the opposite direction.

10. A device for use in simultaneously handling a group of annularly spaced articles and meanwhile maintaining the articles in such annularly spaced relation, comprising a body having an annular recess adapted to receive portions of said annularly spaced articles therein and also having a sleeve portion containing an annular row of spaced slots extending substantially concentrically of said recess with the individual slots extending in a direction substantially radially of said body and transversely to said recess, an annular group of blades, means mounting said blades on said body for swinging movement in said slots such that the blades are adapted to be swingingly projected into or retracted from the spaces between adjacent articles for clamping or releasing the articles, and a substantially cylindrical member reciprocably movable on said body for causing substantially simultaneous projection or retraction of the blades.

11. A device for use in simultaneously handling a group of annularly spaced articles and meanwhile maintaining the articles in such annularly spaced relation, comprising a body having an annular recess extending thereinto from one end and adapted to receive portions of said annularly spaced articles therein and also having a sleeve portion coextensive with said recess, an annular row of spaced slots in said sleeve portion at said one end of the body and extending substantially concentrically of said recess with the individual slots extending in a direction substantially radially of said body and transversely to said recess, an annular group of blades movable in said slots, pivot means mounting said blades on said body and permitting the blades to be swingingly projected into or retracted from the spaces between the articles for clamping or releasing the articles, said blades being tapered and of a thickness to produce a clamping action on the articles when projected into the spaces therebetween, and a sleeve reciprocably movable on said body for causing substantially simultaneous projection or retraction of the blades.

12. A device for use in simultaneously handling a group of annularly spaced articles and meanwhile maintaining the articles in such annularly spaced relation, comprising a body having an annular recess adapted to receive portions of said annularly spaced articles therein and also having a sleeve portion containing an annular row of spaced slots extending substantially concentrically of said recess with the individual slots extending in a direction substantially radially of said body and transversely to said recess, an annular group of blades movable in said slots and adapted to be projected into or retracted from the spaces between adjacent articles for clamping or releasing the articles, a substantially cylindrical member reciprocably movable on said body for causing substantially simultaneous projection or retraction of the blades, and toggle action swinging lever means pivoted on said body and having operative connection with said member for actuating the same.

13. A device for use in simultaneously handling a group of annularly spaced articles and meanwhile maintaining the articles in such annularly spaced relation, comprising a body having an annular recess extending thereinto from one end and adapted to receive portions of said annularly spaced articles therein and also having a sleeve portion which is provided at said one end of the body with an annular row of spaced slots extending substantially concentrically of said recess with the individual slots extending in a direction substantially radially of said body and transversely to said recess, opposed resilient rubber rings mounted on said body so as to lie in opposed relation on opposite sides of said recess at a point spaced inwardly of said body from said one end and adapted to grip portions of said articles received therebetween, an annular group of blades, pivot means mounting said blades on said body for swinging movement in said slots such that said blades are adapted to be projected into or retracted from the spaces between adjacent articles for clamping or releasing the articles, a substantially cylindrical member reciprocably movable relative to said body for causing substantially simultaneous projection or retraction of the blades, and ejector means movable relative to said body for ejecting the articles from said recess.

14. A device for use in simultaneously handling a group of annularly spaced elongated articles and meanwhile maintaining the articles in such annularly spaced relation, comprising a body having an annular recess extending thereinto and adapted to receive portions of said annularly spaced articles therein, said body also having an annular row of spaced slots extending substantially concentrically of said recess with the individual slots extending in a direction substantially radially of said body and transversely to said recess, yieldable means mounted in said body adjacent the inner end of said annular recess and adapted to frictionally grip portions of said articles, an annular group of blades movable in said slots and adapted to be projected into or retracted from the spaces between the articles for clamping or releasing the articles, a substantially cylindrical member reciprocably movable relative to said body for causing substantially simultaneous projection or retraction of the blades, and ejector means movable relative to said body and adapted to disengage the articles from the grip of said yieldable means.

15. In combination, a fabricating machine embodying a die mechanism which is adapted to operate simultaneously on a plurality of articles in annularly grouped relation and an ejector for ejecting the grouped articles from the die mechanism, and an article handling device adapted to be applied to said fabricating machine and having a body provided with an annular recess extending thereinto from one end and in which the grouped articles are adapted to be received and means operable to grip or release the articles while the latter are in said recess, said means comprising an annular group of blades pivotally mounted on said body for swinging movement in a direction transversely of said recess and adapted to be moved into the recess so as to engage in the spaces between adjacent articles, the ejector of said fabricating machine being operable to eject the grouped articles from said die mechanism and to simultaneously move the grouped articles into said recess.

16. In combination, a fabricating machine embodying a die mechanism which is adapted to operate on a group of annularly spaced articles simultaneously and an ejector for ejecting the grouped articles from the die mechanism, and an article handling device adapted to be applied to said fabricating machine and having a body provided with an annular recess extending thereinto from one end and in which the grouped articles are adapted to be received and a plurality of tapered blades for clamping or releasing said grouped articles, said blades being pivotally mounted on said body for swinging movement in a direction transversely of said recess and adapted to be moved into said recess so as to engage in the spaces between adjacent articles, the ejector of said fabricating machine being operable to eject the grouped articles from said die mechanism and to simultaneously move the grouped articles into said recess.

17. In combination, a fabricating machine embodying a die mechanism which is adapted to operate simultaneously on a plurality of articles in annularly grouped relation and an ejector for ejecting the grouped articles from the die mechanism, and an article handling device adapted to be applied to said fabricating machine and having a body provided with a recess extending thereinto from one end and in which the grouped articles are adapted to be received and means for gripping the grouped articles for temporarily retaining the same in said body so that the latter can be removed with the articles therein from said fabricating machine, said means comprising an annular group of blades pivotally mounted on said body for swinging movement in a direction transversely of said recess and adapted to be moved into the recess so as to engage in the spaces between adjacent articles, the ejector of said fabricating machine being operable to eject the grouped articles from said die mechanism and to simultaneously move the grouped articles into the recess of said body and said handling device also having an ejector operable therein to subsequently eject the grouped articles therefrom.

18. In combination, a fabricating machine embodying an annular die mechanism which is adapted to operate on a group of annularly spaced articles simultaneously and an ejector for ejecting the grouped articles from said die mechanism, an article handling device adapted to be applied to said fabricating machine and having a body comprising coaxial inner and outer sleeve portions and provided with an annular recess which extends axially into the body from one end thereof between said sleeve portions and in which the grouped articles are adapted to be received, one of said sleeve portions having a row of annularly spaced slots therein which extend in a direction transversely of said recess, means for temporarily retaining the grouped articles in said body including an annular series of tapered blades pivotally mounted on said one sleeve portion and located in the slots thereof and being movable into the spaces between the grouped articles for gripping the same, the ejector of said fabricating machine being operable to eject the grouped articles from said die mechanism and to simultaneously move the grouped articles into the recess of said body and said handling device with the grouped articles therein being liftable from said fabricating machine.

19. In combination, a fabricating machine embodying an annular die mechanism which is adapted to operate on a group of annularly spaced articles simultaneously and an ejector for ejecting the grouped articles from said die mechanism, an article handling device adapted to be applied to said fabricating machine and having a body comprising coaxial inner and outer sleeve portions and provided with an annular recess which extends axially into the body from one end thereof between said sleeve portions and in which the grouped articles are adapted to be received, one of said sleeve portions having a row of annularly spaced slots therein which extend in a direction transversely of said recess, means for temporarily retaining the grouped articles in said body including an annular series of tapered blades pivotally mounted on said one sleeve portion and located in the slots thereof and being movable into the spaces between the grouped articles for gripping the same, and an ejector carried by said body and movable relative thereto for ejecting the grouped articles from the annular recess of said body, the ejector of said fabricating machine being operable to eject the grouped articles from said die mechanism and to simultaneously move the grouped articles into the annular recess of said body and said handling device with the grouped articles therein being liftable from said fabricating machine.

JOHN B. LEECE.

REFERENCES CITED

The following references are of record in the file of this patent:

UNITED STATES PATENTS

| Number | Name | Date |
| --- | --- | --- |
| 175,653 | Bliss | Apr. 4, 1876 |
| 461,812 | Burkhardt | Oct. 27, 1891 |
| 469,052 | Wood | Feb. 16, 1892 |
| 533,733 | Nye | Feb. 5, 1895 |
| 569,431 | Sergeant | Oct. 13, 1896 |
| 1,223,948 | Finney | Apr. 24, 1917 |
| 2,165,789 | Elwell | July 11, 1939 |
| 2,280,003 | Pearson | Apr. 14, 1942 |
| 2,290,381 | Poole | July 21, 1942 |
| 2,423,038 | Merwin | June 24, 1947 |